(12) United States Patent
Davis

(10) Patent No.: US 7,789,257 B2
(45) Date of Patent: Sep. 7, 2010

(54) FRAME FOR A WALL CUT-OUT

(76) Inventor: Morgan C. Davis, 21 Bullards Crossing, Hinsdale, MA (US) 01235

( * ) Notice: Subject to any disclaimer, the term of this patent is extended or adjusted under 35 U.S.C. 154(b) by 126 days.

(21) Appl. No.: 11/482,271

(22) Filed: Jul. 7, 2006

(65) Prior Publication Data
US 2008/0006624 A1   Jan. 10, 2008

(51) Int. Cl.
*H02G 3/08* (2006.01)
(52) U.S. Cl. .................. 220/3.2; 220/3.5; 220/3.9; 220/4.02; 174/58
(58) Field of Classification Search .......... 220/3.2, 220/3.5, 3.9, 4.02; 174/58
See application file for complete search history.

(56) References Cited

U.S. PATENT DOCUMENTS

| 1,490,252 | A | * | 4/1924  | Bissell  | 220/3.6 |
| 3,424,332 | A | * | 1/1969  | Pimentel | 220/3.6 |
| 3,424,333 | A | * | 1/1969  | Pimentel | 220/3.6 |
| 4,673,097 | A | * | 6/1987  | Schuldt  | 220/3.5 |
| 4,761,319 | A |   | 8/1988  | Kraus et al. |  |
| 4,790,501 | A | * | 12/1988 | Waters   | 248/27.1 |
| 4,927,039 | A | * | 5/1990  | McNab    | 220/3.7 |
| RE33,305  | E | * | 8/1990  | Thayer   | 439/560 |
| 5,200,244 | A |   | 4/1993  | Keller   |  |
| 5,476,183 | A | * | 12/1995 | Harpenau | 220/3.3 |
| 5,640,820 | A |   | 6/1997  | Wood     |  |
| 6,162,525 | A |   | 12/2000 | Amy      |  |
| 6,180,879 | B1 | * | 1/2001 | Gretz    | 174/50 |
| 6,393,658 | B1 | * | 5/2002 | Chong    | 16/2.2 |
| 6,419,102 | B1 | * | 7/2002 | Harpenau | 220/3.3 |
| 6,576,837 | B1 | * | 6/2003 | Pimentel | 174/58 |
| D478,872  | S  | * | 8/2003 | Heggem   | D13/152 |
| 6,769,562 | B2 | * | 8/2004 | Schroeder | 220/3.5 |
| 6,825,414 | B2 | * | 11/2004 | Vagedes | 174/58 |
| 6,951,063 | B1 | * | 10/2005 | Hernandez-Zelaya | 34/140 |
| 7,151,218 | B2 | * | 12/2006 | Dinh    | 174/58 |
| 2004/0182857 | A1 | * | 9/2004 | Feyes et al. | 220/3.2 |

* cited by examiner

*Primary Examiner*—Anthony Stashick
*Assistant Examiner*—Christopher B McKinley
(74) *Attorney, Agent, or Firm*—Malcolm J. Chisholm, Jr.

(57) ABSTRACT

For a wall cut-out (100) defining a void (101) within a wall (102) for receiving a utility receptacle (104) wherein the cut-out has a perimeter edge (103) surrounding the void (101), the frame (10) includes an insert-flange (12) dimensioned to be inserted into and to sit within the void (101) adjacent the perimeter edge (103). The insert-flange (12) defines a frame opening (14) between opposed sides of the insert-flange (12). A wall-shelf (20) is secured to the insert-flange (12), and the wall-shelf defines a plane that is parallel to a plane defined by the wall (102). A mud-ridge (22) is secured to the wall-shelf (20) adjacent to and surrounding an interior perimeter (24) of the frame opening (14) and extends away from the wall-shelf (20) to facilitate application of a bonding compound and secure mounting of a receptacle component (106) within the utility receptacle (104).

6 Claims, 9 Drawing Sheets

FRAME FOR A WALL CUT-OUT

TECHNICAL FIELD

The present invention relates to apparatus for facilitating construction of buildings, and the invention especially relates to a frame for surrounding a cut-out in a wall wherein the cut-out receives a utility receptacle and the frame both facilitates application of a bonding compound or plaster around the cut-out and also supports components of the receptacle within the wall.

BACKGROUND ART

It is well known in construction of buildings that electricity, telecommunications and other utility distribution systems include receptacles within walls of a building for safe delivery of the utility to a user. For example, electrical wiring systems utilize outlet and/or switch receptacles within walls for plugging in electrical apparatus, and for switching on and off lights, etc. In constructing a building having walls with such utility receptacles, typically a wall frame is constructed first of vertical studs, and then an electrical system is roughed-in the wall by running wires through holes in the studs to receptacle boxes secured to the studs for outlets and switches, etc. Then a rigid sheet of drywall, also commonly known as sheetrock, is secured to the wall. A builder must align many cut-outs in the drywall to match up with the utility receptacles on the studs. Next, if the cut-outs are matched up properly, the drywall is taped and finished with taping compound; the compound is allowed to dry; then sanded; and then primed and finish painted. Then components of the receptacle are secured within the receptacle box, such as electrical outlets, switches, etc., and finally a cover plate is secured over the receptacle, as is well known.

Frequently, however, the cut-out does not align properly with the receptacle. For example, as shown in FIG. 4, a cut-out 100 may include a substantial gap 101 between a wall 102 and a utility receptacle 104. That presents significant problems. First, the gap 101 must be filled in with plaster or a bonding compound referred to in the trade as "mud" to produce a flush, smooth surface between the receptacle 104 and the wall 102. Second, the switch component 106 includes support ears 108 that are used to bear against the wall 102 to produce a flush surface of the components 106. As seen in FIG. 4, the support ears 108 at the bottom of the cut-out 100 bear firmly against the wall 102, but the support ears 108 at the opposed top of the receptacle 104 are aligned over the gap 101 and have no firm support to bear against in finishing the installation of the utility receptacle 104. When a switch cover plate (not shown in FIG. 4) is secured to the switch component 106, because the support ears 108 are not firmly aligned over the wall 102, use of the switch component 106 through the cover plate will tend to cause the switch component 106 and the entire receptacle to move and appear loose, which will eventually pose a hazard as such wear deteriorates the whole utility receptacle 104 apparatus.

Solutions to such problems include efforts to use specialized drywall patches. For example, U.S. Pat. No. 5,640,820 to Wood shows an apparatus for "Repair of Drywall Surrounding Electrical Boxes" that includes a roll of tear-away repair articles. The articles include a finishing tape border surrounding a mesh interior and a tear-away release liner. The mesh interior is dimensioned to fit around a utility receptacle and the finishing tape border then covers any gaps, cracks, holes, saw lines, or blow outs around the utility receptacle. Prior to application of the repair article, the cracks or holes, etc. would have been filled with a bonding compound. While this repair material facilitates finishing off a flush surface of a disrupted wall adjacent a utility receptacle, a user still faces a difficult problem of applying the bonding compound. Additionally, the repair article is flexible and offers no rigid, firm surface to support the support ears common to most receptacle components.

It is also known to use drywall patch apparatus, such as shown in U.S. Pat. No. 6,162,525 to Amy. The drywall patch of Amy includes a somewhat rigid frame with a depending skirt, wherein the skirt is inserted into a hole or cutout in the drywall, while a peripheral edge of the frame becomes flush with the wall adjacent the cut-out. The skirt within the hole prevents the frame from moving. A drywall paper extends across a void between opposed edges of the frame. A user secures the frame over a hole, and then applies a bonding compound to secure the patch on the wall over the hole. The primary purpose is to provide for a patch for an inadvertent hole, but the frame could be used around a utility receptacle cut-out by removing all or a portion of the drywall paper. The frame, however, still does not provide a rigid backing for the support ears 108, nor does it facilitate application of the bonding compound adjacent edges of the utility receptacle 104 within the cut-out 100.

Accordingly, there is a need for a frame for a wall cut-out that facilitates establishing a smooth, attractive, flat mounting surface in the wall adjacent a utility receptacle within the cut-out and that provides for firm, rigid support for support ears of receptacle components within the utility receptacle.

SUMMARY OF THE INVENTION

The invention is a frame for a wall cut-out, wherein the cut-out defines a void within a wall for receiving a utility receptacle and the cut-out has a perimeter edge surrounding the void. The frame includes an insert-flange dimensioned to be inserted into and to sit within the void adjacent the perimeter edge. The insert-flange defines a frame opening between opposed sides of the insert-flange. A wall-shelf is secured to the insert-flange, and the wall-shelf defines a plane that is parallel to a plane defined by the wall and that is also about perpendicular to the insert-flange. The wall-shelf extends away from the frame opening defined by the insert-flange. A mud-ridge is secured to the wall-shelf adjacent to and surrounding an interior perimeter of the frame opening. The mud ridge extends away from the wall-shelf in a direction away from the insert-flange and away from the wall, and the mud-ridge has a co-planar top edge defining a plane parallel to the plane defined by the wall.

In use of the frame of the present invention, a user inserts the frame so that the insert-flange surrounds the utility receptacle and the wall-shelf is flush with the wall and overlying any gap, saw cut, or hole of the cut-out extending away from the receptacle into the wall. The frame is then secured to the wall, such as by spray adhesive, or staples, small nails driven through the wall-shelf into the wall. Then a user may quickly apply a bonding compound or "mud" with a trowel over the wall-shelf and adjacent wall using the mud-ridge as a trowel guide during application of the mud. Because the mud-ridge completely surrounds the interior perimeter of the frame opening and is raised above the wall-shelf, it is remarkably easy to apply the mud right up to the edge of the receptacle providing a very smooth appearing surface adjacent an exterior perimeter of a cover plate that is to cover the utility receptacle.

It has been determined that use of the present frame for a wall cut-out decreases the amount of time to remedy an improper wall cut-out by over seventy per cent, compared to remedying the problem with no frame or trowel guide. Moreover, if the improper cut-out includes a gap that eliminates any firm section of wall for bearing against support ears of receptacle components, the mud-ridge offers a firm, rigid mounting surface for the support ears. Because the top edge of the mud-ridge is co-planar in a plane parallel with the plane of the wall, support ears on opposed edges of the receptacle components bear against the mud-ridge and thus are in the same plane and parallel to the plane of the wall. Therefore, the frame provides a consistently flush mounting surface so that the cover plate invariably has all of its edges firmly secured in intimate contact with the wall. Consequently, the frame very rapidly produces a work appearing to be of the highest possible craftsmanship from an unsightly, improper wall cut-out.

In a preferred embodiment, the mud ridge extends away from the wall-shelf a distance that is between about one-sixteenth and about one-eighth of an inch. (For purposed herein, the word "about" is to mean plus or minus ten percent.) In a further preferred embodiment, the wall-shelf is perforated to enhance adhesion of the mud bonding compound to the frame. In another embodiment, the mud-shelf includes an adhesive backing or spray adhesive to eliminate the risk of damage to the wall upon use of staples or nails.

In an alternative short-shelf embodiment, the wall-shelf extends away from the insert-flange a distance that is no greater than about five times the distance of the extension of the mud-ridge above the wall-shelf. By such a modest extension of the wall-shelf, a cover plate completely overlies the frame. This permits usage of the short-shelf embodiment in certain circumstances exclusively for adding a rigid bearing surface for support ears of a loose switch or other outlet receptacle components. In other words, if a homeowner, or a builder, finds that a receptacle cut out provides no section of wall for a firm bearing surface for support ears of the receptacle components, and hence the components are, or will be loose within the receptacle, the homeowner or builder may simply remove the cover plate, remove the receptacle components, and then insert a short-shelf embodiment of the frame. In re-installing the receptacle components, the support ears of the components will bear firmly against the top edge of the mud ridge, so that the cover plate may be replaced to provide firmly mounted receptacle components with a flush-mounted cover plate. This can be accomplished in a few minutes, and needs no bonding compound to provide a bearing surface for the support ears. Because the wall-shelf is within a perimeter of the cover plate, no bonding compound or painting is necessary. And, the attachment of the receptacle components to the receptacle secures the short-shelf frame to the receptacle without any need for otherwise securing the short-shelf frame to the wall.

Accordingly, it is a general purpose of the present invention to provide a frame for a wall cut-out that overcomes the deficiencies of the prior art.

It is a more specific purpose to provide a frame for a wall cut-out that facilitates application of a bonding compound around the cut-out and frame adjacent a utility receptacle within the cut-out.

It is an additional purpose to provide a frame for a wall cut-out that provides a rigid bearing surface adjacent support ears of receptacle components.

These and other purposes and advantages of the present frame for a wall cut-out will become more readily apparent when the following description is read in conjunction with the accompanying drawing.

DESCRIPTION OF THE PREFERRED EMBODIMENTS

Figure 1:
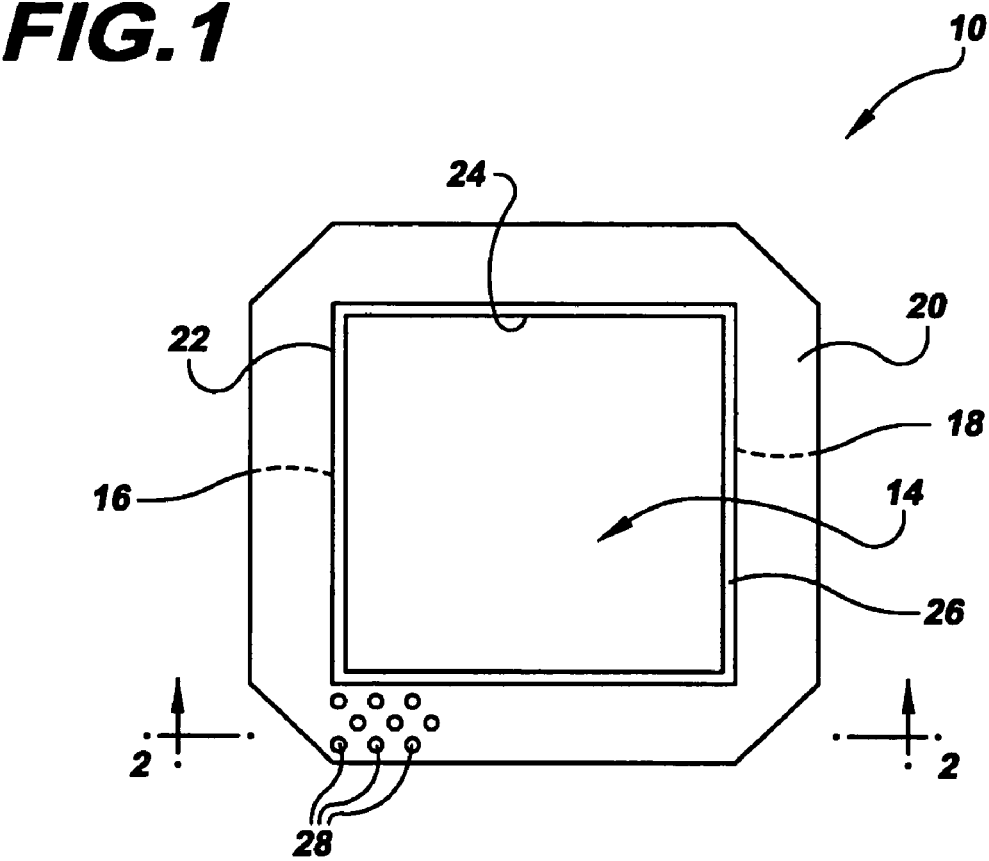
FIG. 1 is a top plan view of a frame for a wall cut-out constructed in accordance with the present invention.
Figure 2:
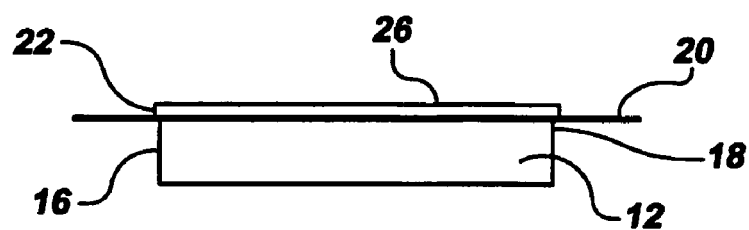
FIG. 2 is a sectional end view of the FIG. 1 frame taken along view line 2-2 of FIG. 1.

Referring to the drawings in detail, a frame for a wall cut-out is shown in FIGS. 1 and 2, and is generally designated by the reference numeral 10. The frame 10 includes an insert-flange 12 dimensioned to be inserted into and to sit within a cut-out void 100 (shown in FIG. 4) adjacent a perimeter edge 103 of the void 100. The insert-flange 12 defines a frame opening 14 between opposed sides 16, 18 of the insert-flange 12. A wall-shelf 20 is secured to the insert-flange 12, and the wall-shelf 20 defines a plane that is parallel to a plane defined by the wall 102 (shown in FIG. 4) and that is also about perpendicular to the insert-flange 12. The wall-shelf 20 extends away from the frame opening 14 defined by the insert-flange 12. A mud-ridge 22 is secured to the wall-shelf 20 adjacent to and surrounding an interior perimeter 24 of the frame opening 14. The mud ridge 22 extends away from the wall-shelf 20 in a direction away from the insert-flange 12 and away from the wall 102, and the mud-ridge has a co-planar top edge 26, meaning that top edges of all sides of the mud ridge 22 define a plane, and that plane of the mud ridge top edge is parallel to the plane defined by the wall 102. In a preferred embodiment, the mud ridge 22 extends away from the wall-shelf 20 a distance that is between about one-sixteenth and about one-eighth of an inch. In another preferred embodiment shown in FIG. 1, the wall-shelf 20 may define a plurality of perforations 28 to facilitate bonding of any plaster or "mud" etc. to the wall-shelf 20.

Figure 3:
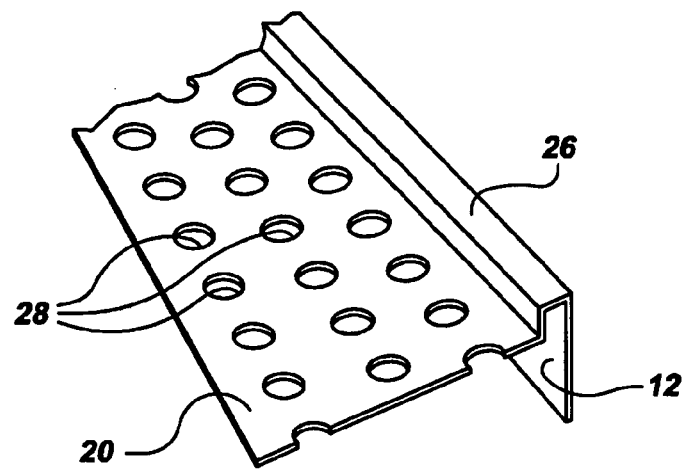
FIG. 3 is a raised perspective view of a section of a frame for a wall cut-out showing an insert-flange, wall-shelf and mud-ridge of the frame section.

FIG. 3 shows a perspective view of a section of the FIG. 1 frame 10 to better present the relationship between the insert-flange 12, the wall-shelf 20, the mud-ridge 22, and the top edge 26 of the mud-ridge 22. The perforations 28 are also shown in FIG. 3. It is pointed out that sections of the frame 10 are similar to, and the frame 10 may be constructed from, a product available in the marketplace and commonly identified by tradespersons as a "vinyl L bead". Such "vinyl L beads" are commonly used for providing firm support for a drywall edge, such as a doorway, wherein the crotch between the insert-flange 12 and the wall-shelf 20 is secured over the drywall edge. Such "vinyl L beads" may be purchased under the trademark "CHAMFER BEAD" manufactured by TRIM TEX, Inc., of Lincolnwood, Ill., 60712. Such "vinyl L beads" have not been known in the art to be used to form a frame as described herein.

Figure 4:
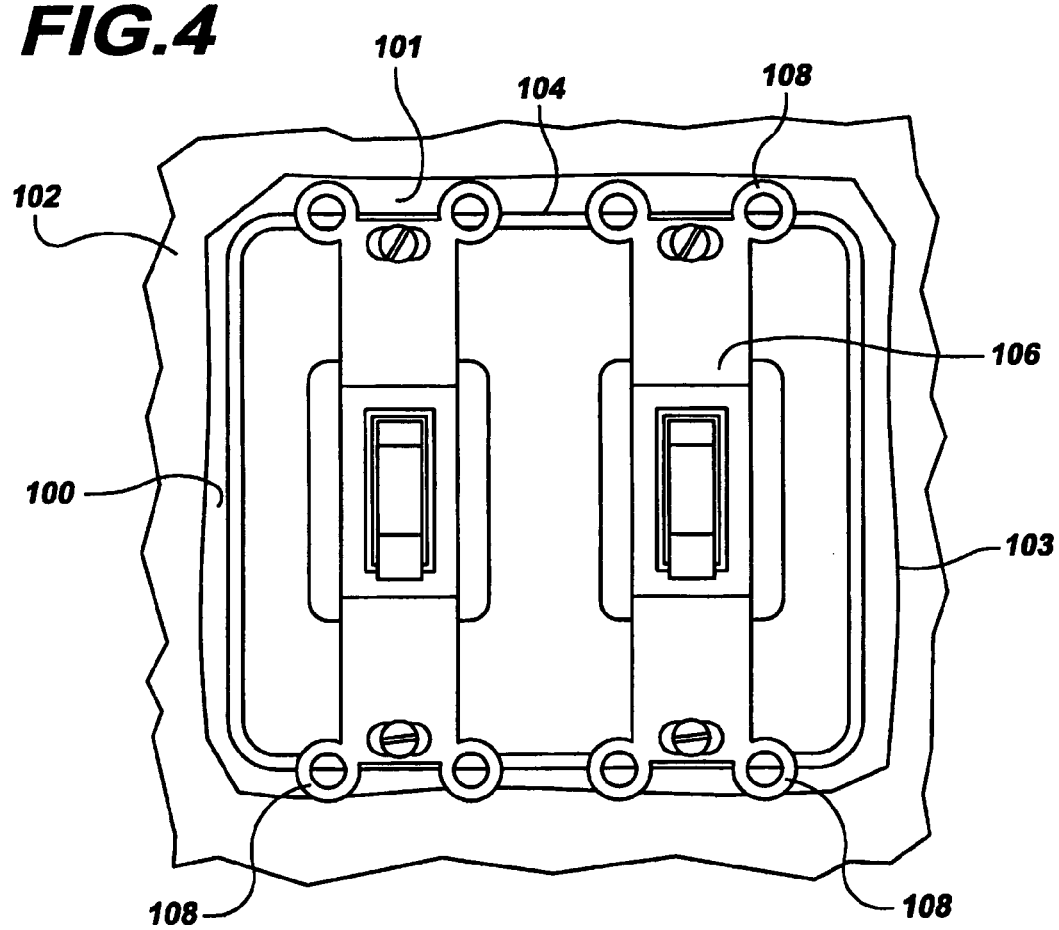
FIG. 4 is a top plan view of a wall showing an improper wall cut-out, a utility receptacle within the cut-out, and receptacle components within the receptacle.

FIG. 4 has been described above and shows a cut-out 100 defining a gap or void 101 in a wall 102 with a utility receptacle 104 and utility receptacle components 106 secured within the receptacle 104 so that support ears 108 at the top of the utility component 106 are aligned over the gap or void 101 in the wall rather than over the wall 102.

Figure 5:
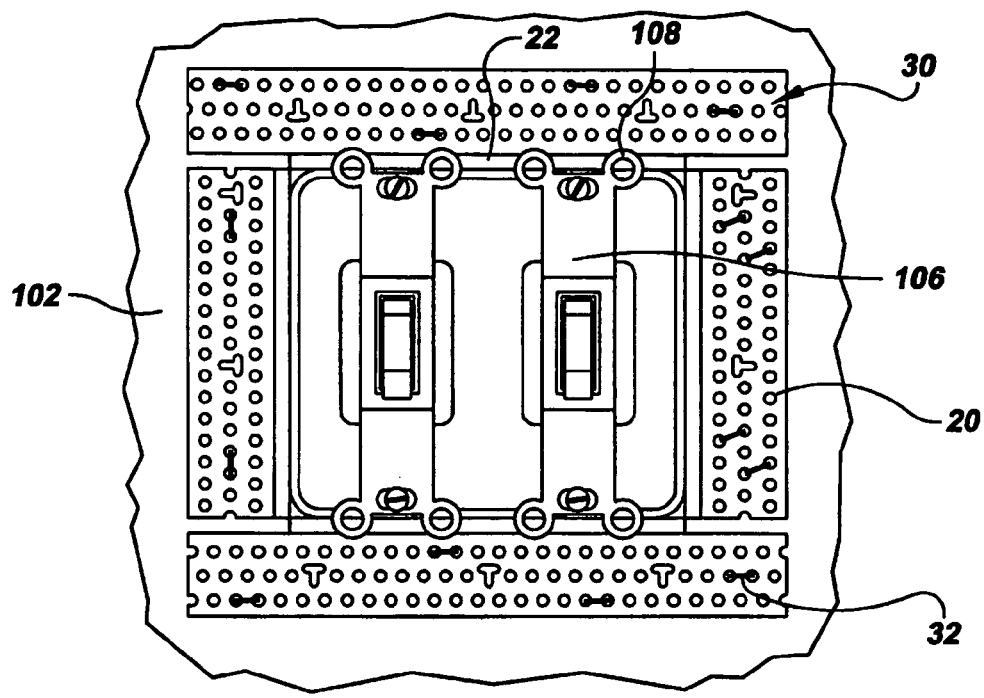
FIG. 5 is a top plan view of the FIG. 4 receptacle, showing a frame of the present invention for a wall cut-out installed over the utility receptacle.

FIG. 5 shows the FIG. 4 utility receptacle 104 and wall cut-out 100 with a frame 30 secured within the void 101, having the wall-shelf 20 overlying the wall 102. It can be seen that the mud-ridge 22 of the FIG. 5 frame 30 sits directly under the support ears 108 of the receptacle components 106, thereby providing a rigid, firm support for the ears 108. To apply the FIG. 5 frame 30, first the receptacle component 106 is removed, then the frame 30 is inserted into the void 101 so that its insert-flange 12 (not seen in FIG. 5) surrounds the utility receptacle 104, and then the wall-shelf 20 is secured to the wall 102, such as by staples 32. It is pointed out that while the FIG. 5 frame 30 is dimensioned to be inserted around the utility receptacle 104 shown in FIGS. 4 and 5, the insert-flange 12 of the frame 30 may be dimensioned to be slightly large than the dimensions of known utility receptacles 104. For purposes herein the phrase "utility receptacle" is to mean any known box-like structure, whether of metal, plastic or any known materials, that is used to be secure adjacent a back side of a wall so that a utility supply (including electricity, telecommunications, gases, etc.) may be delivered or controlled from components within the utility receptacle, such as a "switch box", "outlet box", "duplex receptacle", etc.

Figure 6:
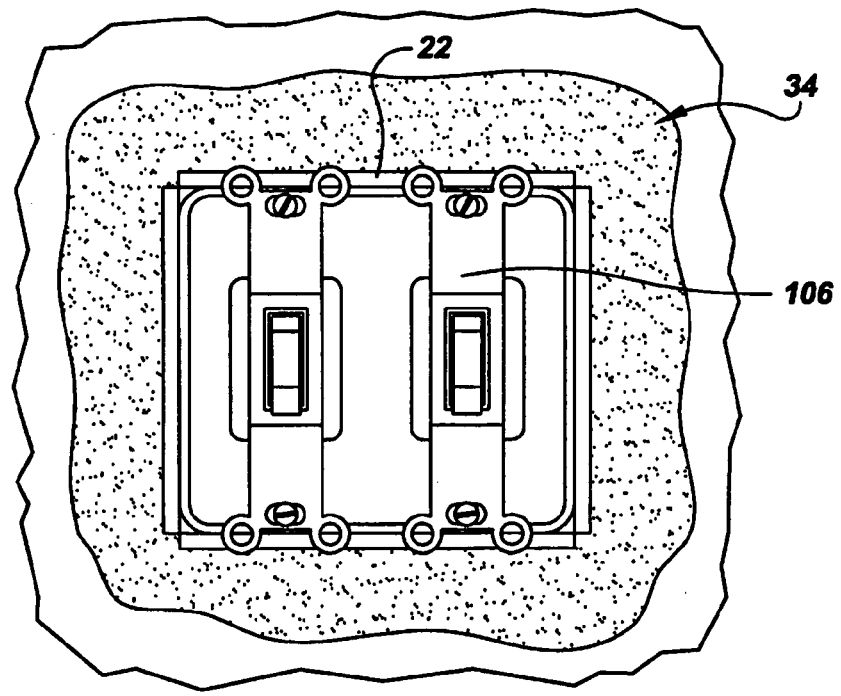
FIG. 6 is a top plan view of the FIG. 5 wall showing a bonding compound covering a wall-shelf of the frame.

FIG. 6. shows the FIG. 5 frame 30 covered over by a coating of bonding compound 34 such as "mud" known in the art, to produce a smooth, flush mounted receptacle 104, having a firm support for the receptacle component 106 against the mud-ridge 22. After the "mud" has been applied and allowed to dry and has then been sanded to a smooth surface, the switch component 106 is re-wired and secured within the receptacle 104.

Figure 7:
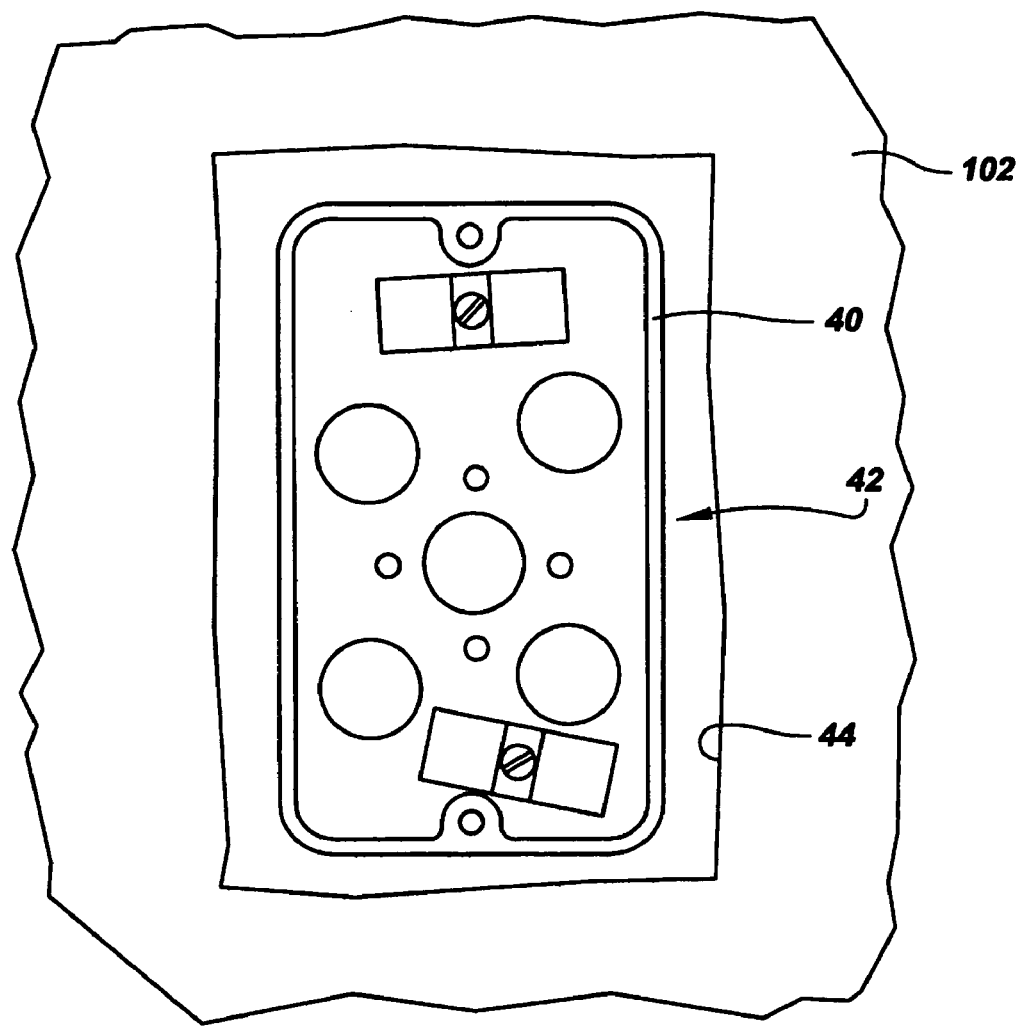
FIG. 7 is a top plan view of a wall showing an improper cut-out and a utility receptacle within the cut-out.
Figure 8:
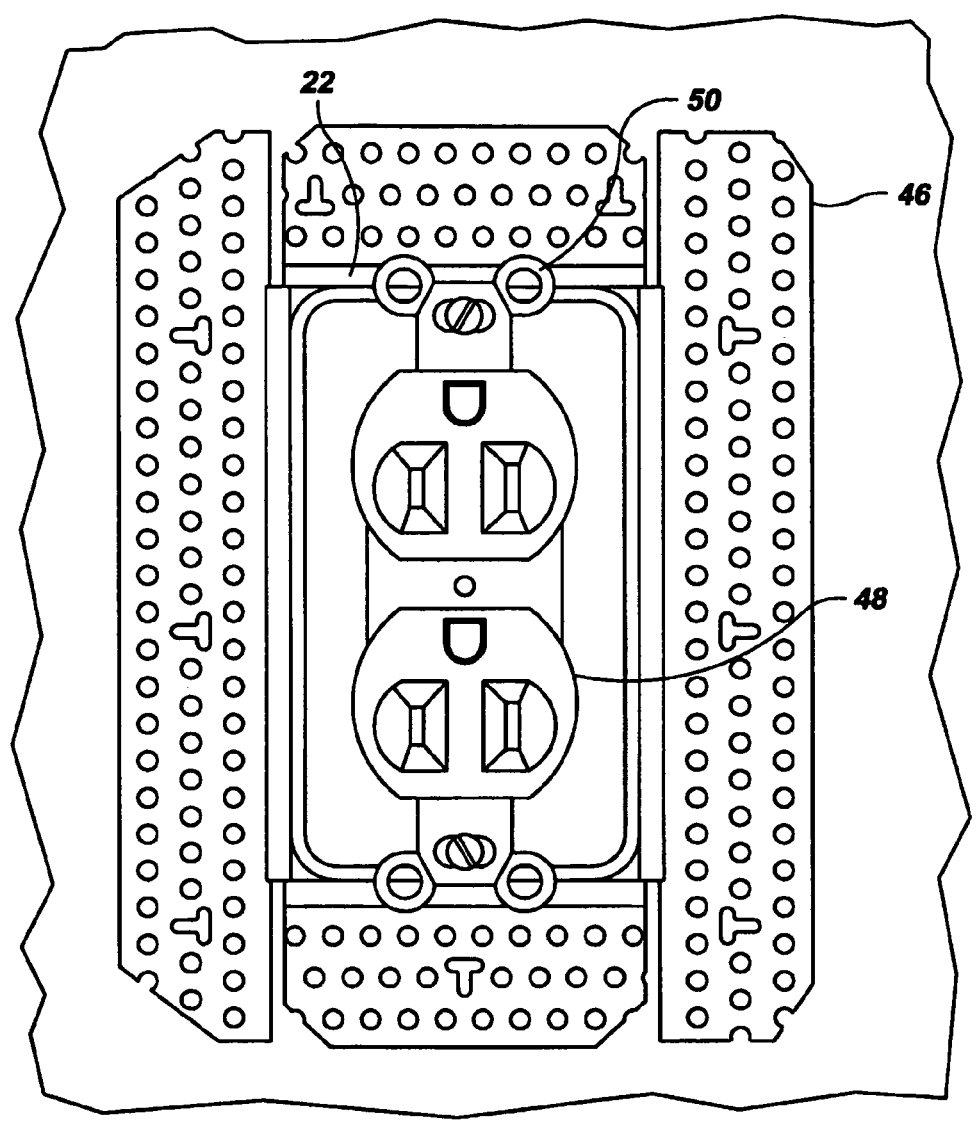
FIG. 8 is top plan view of the FIG. 7 utility receptacle showing receptacle components within the receptacle and showing a frame of the present invention over the cut-out.

FIG. 7 shows a different sized utility receptacle 40 that defines a void 42 within the wall 102, wherein the void includes a perimeter edge 44. FIG. 8, shows a different sized frame 46 secured within the FIG. 7 void 42, and a different form of receptacle component 48 (an electrical outlet receptacle component) secured within the FIG. 7 receptacle 40 so that support ears 50 of the FIG. 8 receptacle component bear firmly against the mud-ridge 22 of the FIG. 8 frame 46.

Figure 9:
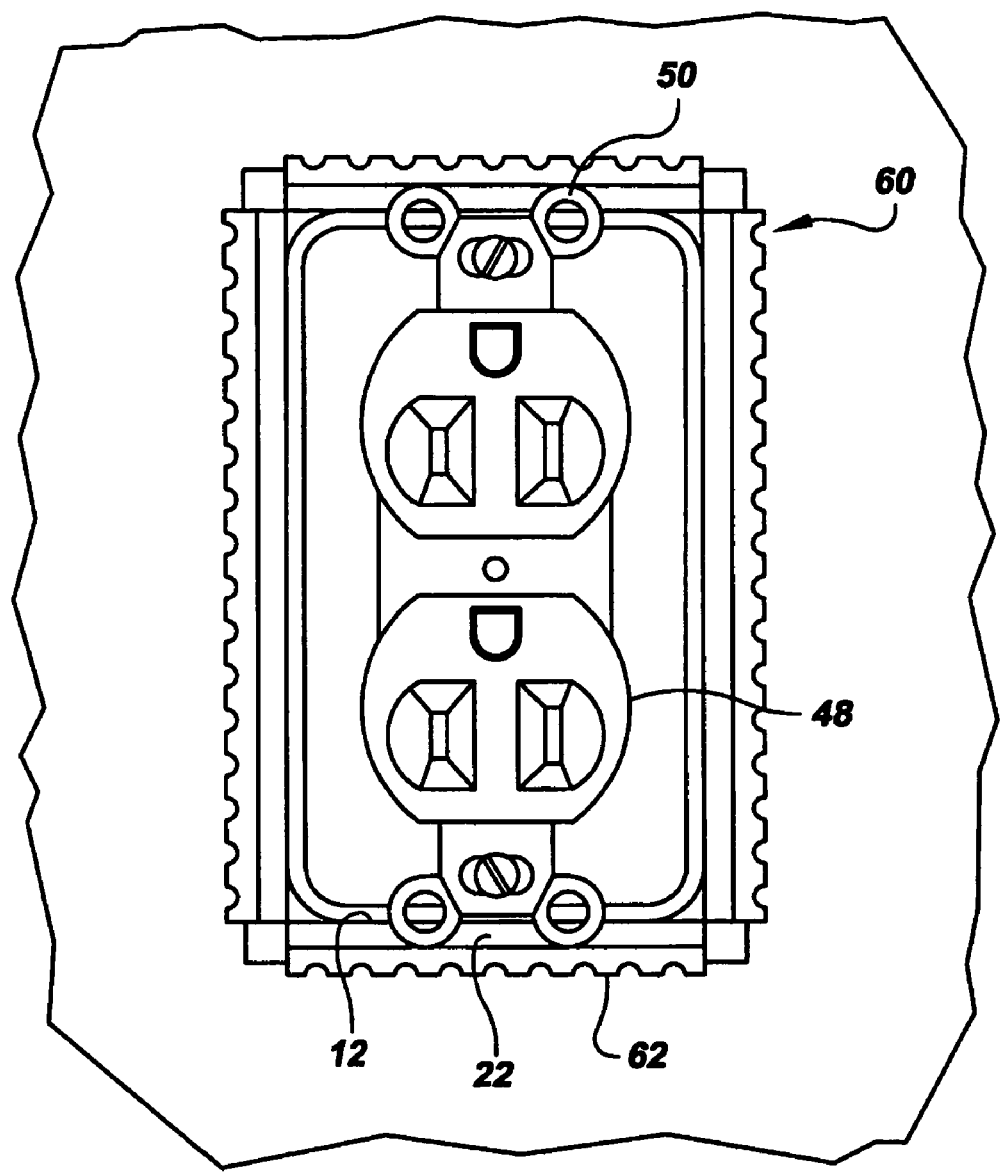
FIG. 9 is a top plan view of the FIG. 8 utility receptacle showing a short-shelf embodiment of the frame for a wall-cut out over the cut-out.
Figure 10:
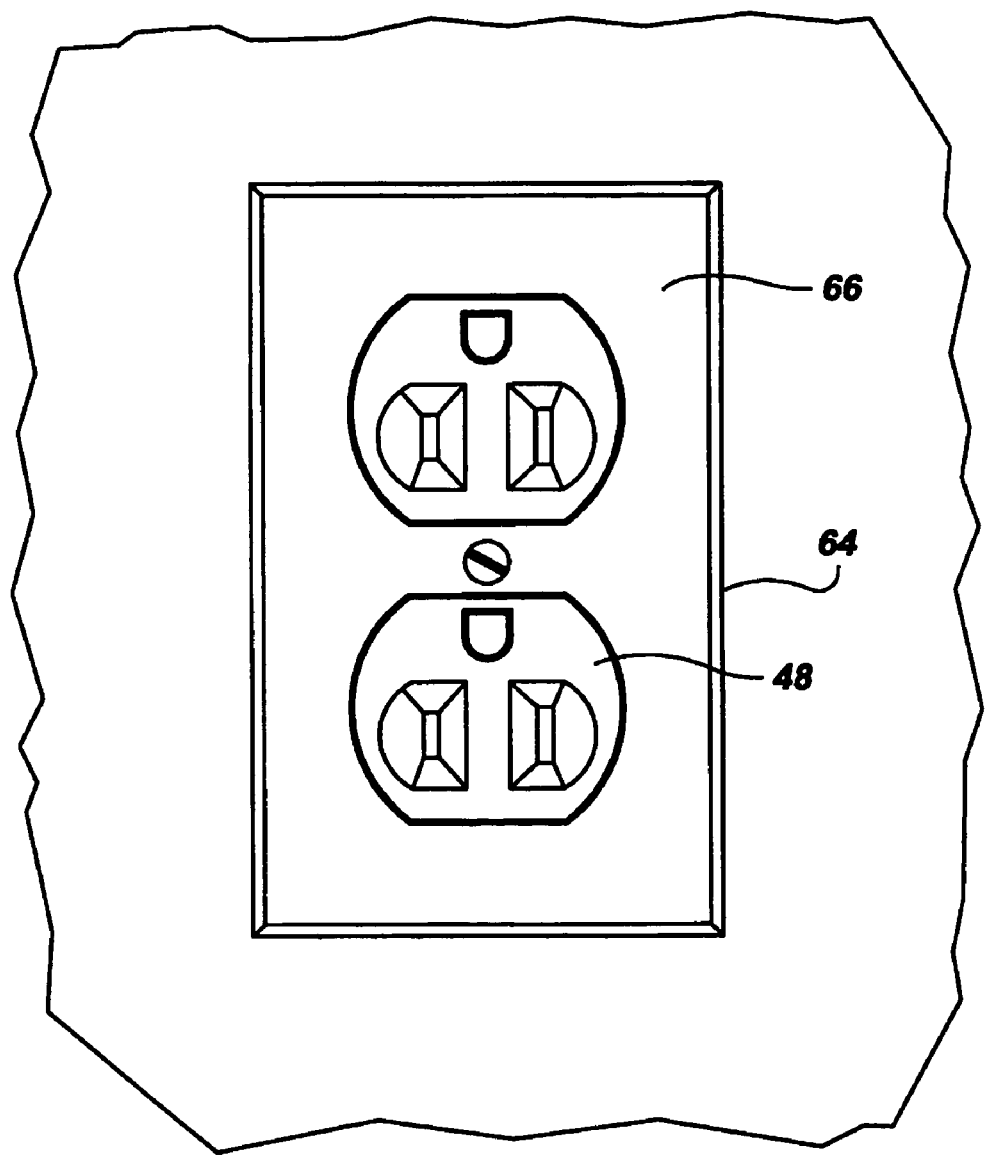
FIG. 10 is a top plan view of the FIG. 9 utility receptacle showing a cover plate secured and overlying the short-shelf embodiment of the frame of the present invention.

FIG. 9 shows a short-shelf frame 60 embodiment disposed within the FIG. 7 void 42. As described above, the short-shelf embodiment of the frame 60 includes a shorter wall-shelf 62 that extends away from the insert-flange 12 a distance that is no greater than about five times a distance of extension of the mud-ridge 22 above the wall-shelf 62. More importantly, and as shown in FIG. 10, the wall-shelf 62 is dimensioned to remain within an exterior perimeter 64 of a cover plate 66 that is secured over the short-shelf frame 60. This permits usage of the short-shelf frame embodiment 60 in certain circumstances exclusively for adding the mud-ridge 22 as a rigid bearing surface for the support ears 50 of the outlet receptacle component 48.

Figure 11:
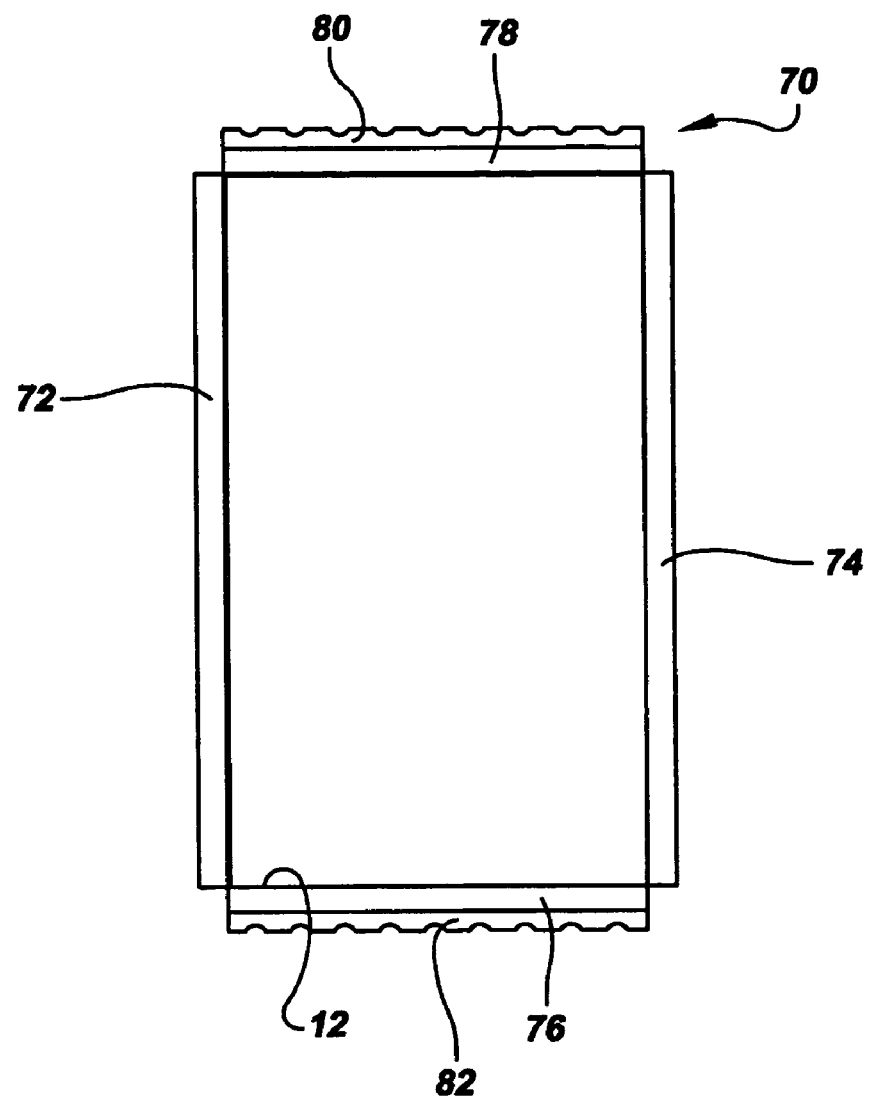
FIG. 11 is a top perspective view of a short-shelf embodiment of the frame for a wall cut-out of the present invention.

FIG. 11 shows another version of a short-shelf frame embodiment 70 removed from any wall cut-out 100. In the FIG. 11 short-shelf frame 70, the frame 70 defines two opposed long sides 72, 74 and two opposed short sides 76, 78. The two opposed short sides 76, 68, include first and second wall-shelves 80, 82 having the above described short-shelf limitations wherein the wall-shelves 80, 82 adjacent the opposed short sides 76, 78 extend away from the insert-flange 12 a distance that is no greater than about five times a distance of extension of the mud-ridge 22 above the wall-shelf 62. The opposed long sides 72, however, in the FIG. 11 embodiment may have no wall shelves. This provides for an embodiment wherein a user only needs to provide a firm, rigid bearing surface for the support ears 50, and does not need wall shelves on the opposed long sides 72, 74. In all short-shelf embodiments 60, 70 of the frame, however, any wall-shelf is dimensioned to remain within an exterior perimeter 64 of a cover plate 66 that is secured over the short-shelf frame 60 for the purposes described above of permitting usage of the frame 60, 70 exclusively for supporting the receptacle component 48.

Figure 12:
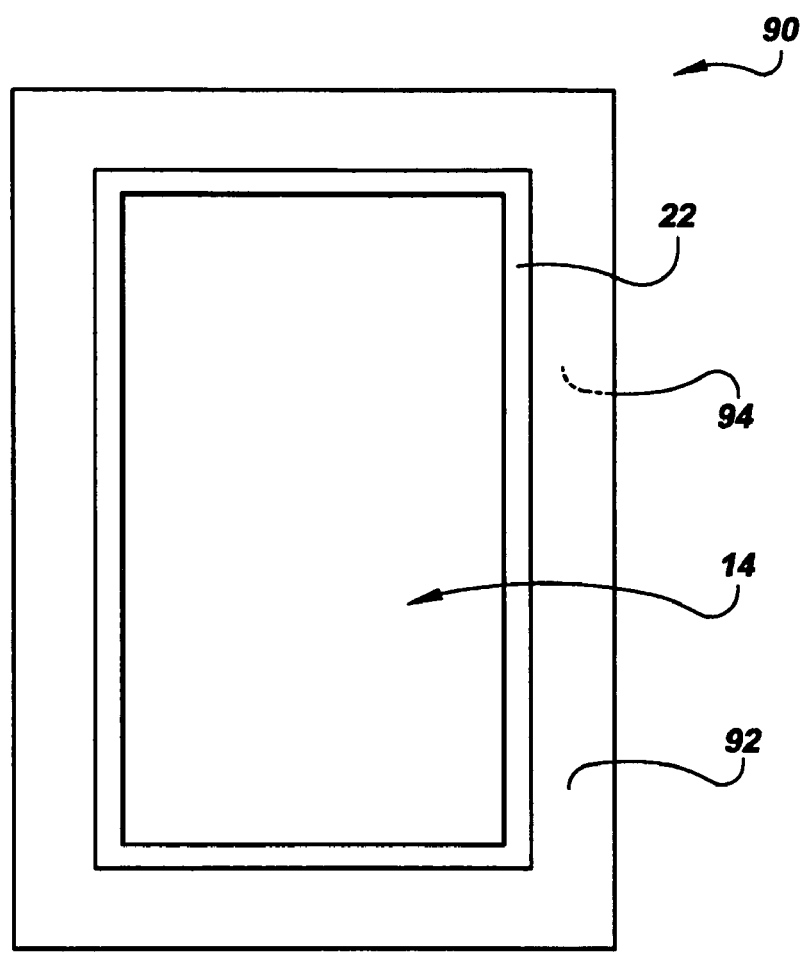
FIG. 12 is a top plan view of an embodiment of the frame of the present invention showing a wall-shelf of the frame having no perforations.

FIG. 12 shows an alternative, non-perforated wall-shelf 90 embodiment of the frame, wherein the wall-shelf 92 is non-perforated and includes an adhesive on a wall-contact side 94 of the wall-shelf 92. In a preferred embodiment, the adhesive would be applied to the wall contact side during manufacture and protected by a release liner (not shown) known in the trade. Alternatively, the adhesive could be applied by spray or brush at the time of usage of the frame 90.

As can be seen, the frame 10, 30, 60, 70 for a wall cut-out of the present invention provides enormous advantage in repairing improper cut-outs 42, 100 by facilitating application of a bonding compound and/or providing a rigid, firm bearing surface for support ears 50, 108 of receptacle components within utility receptacles 40, 104 within the cut-outs 42, 100. Both advantages are obtained in a single frame 10, and the frame 10 provides for implementation of these advantages with extraordinary efficiency.

While the present invention 10 has been disclosed with respect to the described and illustrated embodiments, it is to be understood that the invention is not to be limited to those embodiments. It is pointed out for example that for the "vinyl-L beads", such as the "CHAMFER BEAD" available from the above-referenced TRIM TEX, Inc. company, the component identified herein as a "wall shelf" is identified by TRIM TEX as a "mud leg"; and, the component identified as an "insert flange" herein is identified by TRIM TEX as a "return leg". Additionally, while the preferred material of manufacture of the present frame for a wall cut-out is a plastic, such as the material used in known "vinyl L-beads", any other material known in the art that will perform the function of the frame 10 is satisfactory. Accordingly, reference should be made primarily to the following claims rather than the foregoing description to determine the scope of the invention.

What is claimed is:

1. A frame (10) and a utility receptacle (104) for a wall cut-out (100), the cut-out (100) defining a void (101) within a wall (102) for receiving the utility receptacle (104) and the cut-out (100) having a perimeter edge (103) surrounding the void, the frame (10) and the utility receptacle (104) comprising:

a. the frame (10) having an insert-flange (12) dimensioned to sit within the void (101) adjacent the perimeter edge (103), the insert-flange (12) defining a through void frame opening (14) between opposed sides of the insert-flange (12);

b. the frame (10) having a wall-shelf (20) secured to the insert-flange (12), the wall-shelf (20) defining a plane parallel to a plane defined by the wall (102) and about perpendicular to the entire insert-flange (12), and the wall-shelf (20) extending away from the frame opening (14) defined by the insert-flange (12);

c. the frame (10) having a mud-ridge (22) secured to the wall-shelf (20) adjacent to and surrounding an interior perimeter (24) of the frame opening (14), the mud-ridge (22) extending away from the wall-shelf (20) in a direction away from the insert-flange (12) and away from the wall (102), and the mud-ridge (22) having a co-planar top edge (26) defining a plane parallel to the plane defined by the wall (102); and, d. the utility receptacle (104) being dimensioned to be smaller than the through void frame opening (14) defined by the insert-flange (12) so that the insert-flange (12) surrounds the utility receptacle (104) and the utility receptacle (104) is within the through void frame opening (14) whenever the frame (10) is inserted into the void (101) and the wall shelf (20) overlies the wall (102).

2. The frame (10) of claim 1, wherein the mud ridge (22) extends away from the wall-shelf (20) a distance that is between about one-sixteenth and about one-eighth of an inch.

3. The frame (10) of claim 1, wherein the wall-shelf (20) includes a plurality of perforations (28).

4. The frame (10, 60) of claim 1, wherein the frame (60) includes a short wall-shelf (62) that is dimensioned to remain within an exterior perimeter (64) of a cover plate (66) that is secured over the frame (60).

5. The frame (10, 60) of claim 1, wherein the frame (60) includes a short wall-shelf (62) that extends away from the insert-flange (12) a distance that is no greater than about five times a distance of extension of the mud-ridge (22) above the wall-shelf (62).

6. The frame (10, 70) of claim 1, wherein the frame (70) defines two opposed long sides (72, 74) and two opposed short sides (76, 78), the two opposed short sides (76, 68) including first and second wall-shelves (80, 82) adjacent the opposed short sides (76, 78) wherein the first and second wall-shelves (80, 82) extend away from the insert-flange (12) a distance that is no greater than about five times a distance of extension of the mud-ridge (22) above the first and second wall-shelves (80, 82) and the wall-shelves (80, 82, 20) are dimensioned to remain within an exterior perimeter (64) of a cover plate (66) that is secured over the frame (60).

* * * * *